United States Patent [19]

Willard et al.

[11] 4,074,411

[45] Feb. 21, 1978

[54] RING REMOVING WRENCH

[76] Inventors: David A. Willard, 545 Elder Court, San Jose, Calif. 95123; Raymond W. Thomas, 1369 Lexington Drive, San Jose, Calif. 95117

[21] Appl. No.: 792,148

[22] Filed: Apr. 29, 1977

[51] Int. Cl.[2] .............. B23P 19/08

[52] U.S. Cl. .............. 29/267; 29/282

[58] Field of Search .............. 29/213 E, 267, 282, 29/229, 235

[56] References Cited

U.S. PATENT DOCUMENTS

| | | | |
|---|---|---|---|
| 1,311,836 | 7/1919 | Norris | 29/267 X |
| 1,892,900 | 1/1933 | Marshall | 29/267 X |
| 2,566,598 | 9/1951 | Castner | 29/267 X |
| 2,889,618 | 6/1959 | Morris | 29/267 |
| 3,028,664 | 4/1962 | Shepanski | 29/282 |

*Primary Examiner*—Jimmy C. Peters
*Attorney, Agent, or Firm*—Phillips, Moore, Weissenberger, Lempio & Majestic

[57] ABSTRACT

Bottom loading couplers transfer petroleum and other products into tank trucks and the like. It is necessary to replace an annular seal which is held in place by a metallic ring to maintain adequate sealing of such couplers. A circularly symmetrical wrench slides over the ring, extends fingers thereunder and is levered to provide an upward force upon the ring which removes it. After replacement of the radial seal and ring is replaced with the same wrench which exerts a force atop the ring via an opposite application of the levering arrangement.

13 Claims, 5 Drawing Figures

RING REMOVING WRENCH

BACKGROUND OF THE INVENTION

1. Field of the Invention

The invention relates to a specialized wrench for removing a ring which fits tightly about a cylindrical member. More particularly the invention is concerned with such a wrench for use with a bottom loading coupler to remove the ring therefrom and to allow replacement of an annular seal used in such a coupler.

2. Prior Art

The use of bottom loading couplers to load fluid such as liquids and even fluidized powders into tank trucks and the like has been increasing steadily over the years. Such bottom loading couplers have the advantage that the transfer is completely sealed from the external atmosphere and hence noxious fumes and the like are prevented from escaping into the atmosphere and the atmosphere is prevented from contaminating the tank trucks and the like. Present Federal and State regulations require that such sealed transfer be utilized in all such loading situations by 1980.

In bottom loading couplers an annular elastomeric seal is normally abutted against a tank truck adaptor which serves as the orifice through which the tank truck is filled. Such a seal fits about a cylindrical member and is held in place by a cylindrical metal ring which fits externally thereabout and which fits tightly against the same cylindrical member. When the elastomeric annular member has worn or torn with use it has to be replaced. The prior art replacement method has consisted of utilizing a tool which resembles a screwdriver having the end thereof bent to pry up underneath the metal ring until the metal ring is loosened sufficiently to remove it by hand. Thereafter the elastomeric annular member is removed and a new elastomeric annular member inserted in its place and then the ring is replaced and forced downwardly using a mallet or the like.

Since bottom loading couplers are quite heavy this is a difficult operation often requiring two men to successfully complete it. Further, the use of a screwdriver to pry up the metallic ring has often led to damage to the metallic ring which is usually formulated of aluminum or the like. Still further the removal of the metallic ring has taken a good deal of time since this ring is usually very tightly mated about the external surface of the cylindrical member about which it fits. Yet further, the pounding in of the metallic ring with a mallet can lead to damage to the ring or to the annular elastomeric member which is being positioned thereby.

In view of the abovementioned problems of the prior art it would be advantageous to provide a wrench apparatus for removing and replacing a ring which accomplish this quickly and which accomplish this without any chance of serious damage to the ring or to the annular elastomeric member which is seated thereby. The present invention is concerned with just such an apparatus.

SUMMARY OF THE INVENTION

The invention is concerned with apparatus for removing and replacing a ring which fits tightly about a cylindrical member, the member proceeding away from a generally flat surface, a generally circular flange proceeding from a portion of said surface outwardly radially of said ring. The apparatus comprises a sleeve sized to fit about the ring with a first end of the sleeve adjacent the surface. Means are carried by the sleeve and spaced circumferentially thereabout for engaging a first end of the ring. The first ring end is adjacent the surface. Means are provided for selectively positioning the first ring end engaging means in and out of engagement with the first ring end. A support is provided extending from a second end of the sleeve away from the surface. A lever is provided along with means for pivotally attaching a central portion thereof to the support. In addition means are attached adjacent an end of the lever for engaging with the flange whereby on pivoting of the lever to cause the flange engaging means to exert a force on the flange towards the surface, the first end ring engaging means move the ring away from the surface and thus remove the ring from the cylindrical member. In most embodiments of the present invention means are provided supported by the sleeve for engaging a second end of the ring whereby on pivoting of the lever to cause the flange engaging means to exert a force on the flange away from the surface the second end ring engaging means move the ring towards the surface and replace the ring about the cylindrical member.

BRIEF DESCRIPTION OF THE DRAWINGS

The invention will be better understood by reference to the figures of the drawings wherein like numbers denote like parts throughout and wherein.

DETAILED DESCRIPTION OF THE PREFERRED EMBODIMENT

Figure 1:
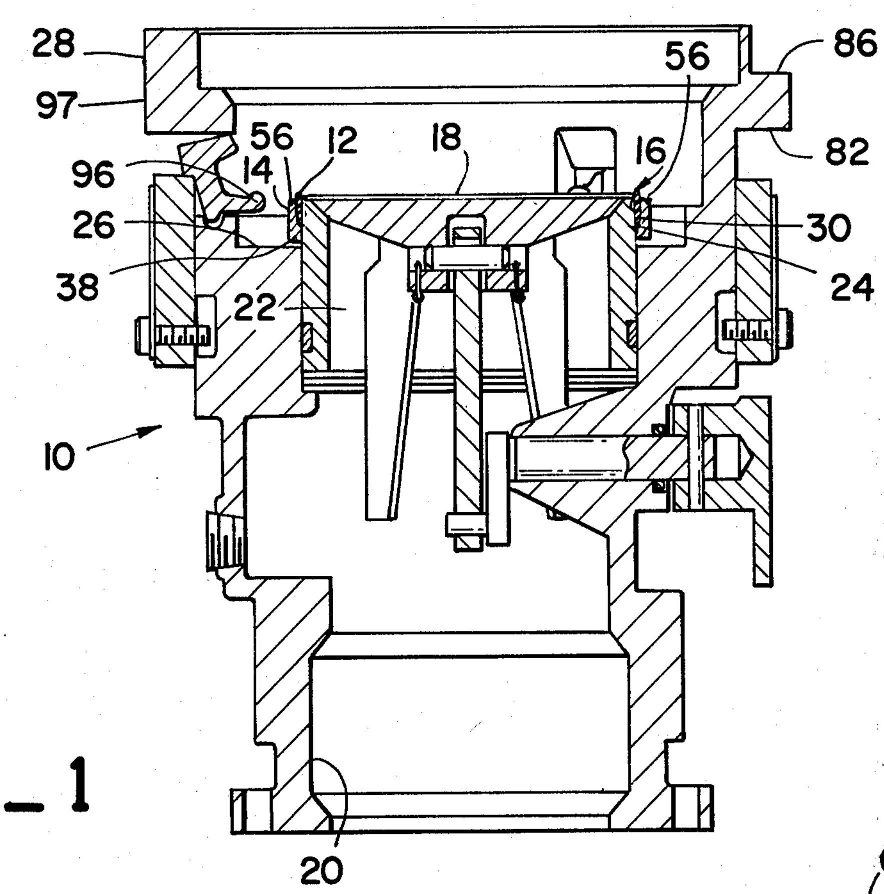
FIG. 1 illustrates a bottom loading coupler with which the apparatus of the present invention is particularly useful.

Referring first to FIG. 1 there is illustrated therein a bottom loading coupler 10 which seals to mate a tank truck adaptor (not illustrated) via an elastomeric ring 12 which is itself held in place by a metal ring 14. The seal takes place between an annular surface 16 formed by the elsatomeric ring 12 and a flat portion of the aforementioned tank truck adaptor. In use, a central piston 18 of the bottom loading coupler 10 is advanced upwardly in FIG. 1 whereby flow from a hose (not illustrated) comes through a central passage 20 of the coupler 14 and thence via a duct area 22 and up around the piston 18.

The ring 14 fits tightly about a cylindrical member 24 which forms a part of the coupler 10. The cylindrical member 24 proceeds away from a generally flat surface 26 of the coupler 10 and a generally circular flange 28 also proceeds from a portion of the generally flat surface 26 which is outwardly radially of the ring 14. The elastomeric ring 12 is held in place by the metallic ring 14 which is itself held in place by its tight fit about an outer surface 30 of the cylindrical member 24.

Figure 2:
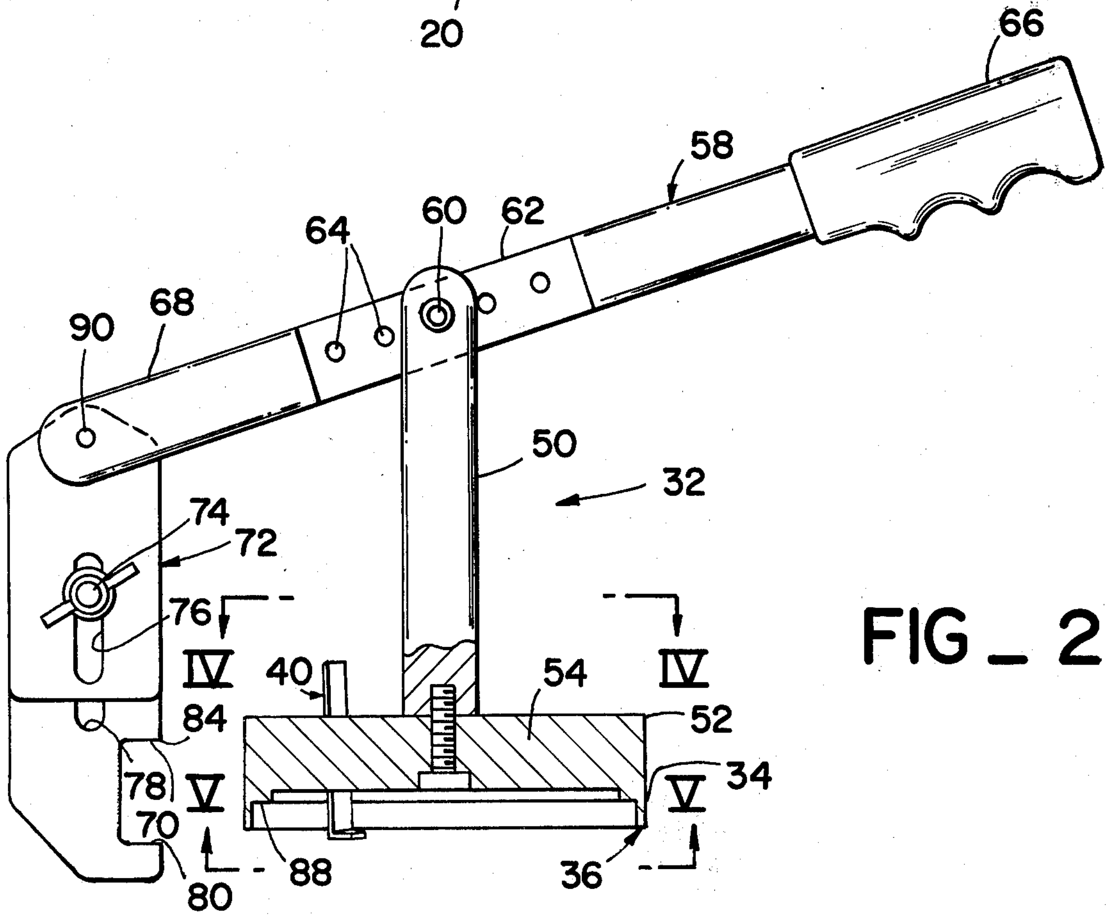
FIG. 2 illustrates in side view, partially in section, an apparatus in accordance with the present invention.
Figure 3:
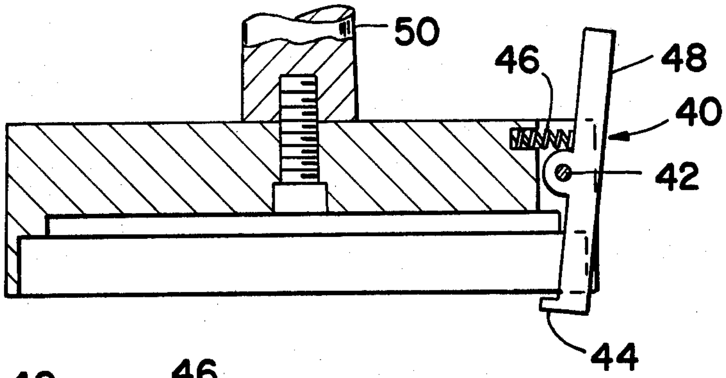
FIG. 3 illustrates a detail in the structure of the preferred apparatus in accordance with the present invention.

Referring now to FIG. 2, there is illustrated therein an apparatus 32 in accordance with the present invention. The apparatus 32 includes a sleeve 34 which is sized to fit about the ring 14 with a first end 36 of the sleeve 34 adjacent the aforementioned generally flat surface 26. Means are carried by the sleeve 34 and are spaced circumferentially thereabout for engaging with a first end 38 of the ring 14. The first ring end 38 is located adjacent the aforementioned surface 26. The means carried by the sleeve in the particular embodiment illustrated are a plurality of arms 40 each of which is spaced circumferentially about the sleeve 34. Means are provided for mounting the arms 40 to the sleeve 34. In the embodiment illustrated this means comprises a plurality of pivots 42, one of which is shown in detail in FIG. 3 along with toe means 44 on each of the arms 40. The toe means 44 serve for engagingly contacting the first end 38 of the ring 14.

Means are also provided for selectively positioning the first ring end engaging means, in the preferred embodiment the toe means 44, in and out of engagement with the first ring end 38. In the particular embodiment illustrated and as will be most apparent by reference to FIGS. 3 and 4 the preferred selective positioning means comprise means for biasing the first ring end engaging means, i.e., the toe means 44, into engagement with the first ring end 38, the biasing means in the particular embodiment illustrated comprising a plurality of springs 46 in one to one relation with the arms 40 along with extending portions 48 of the arms 40 against which a force is operator exertable to overcome the biasing means. Thus in the embodiment illustrated one simply pushes upon the portion 48 of a respective arm 40 to cause the respective toe means 44 to pivot about the respective pivot 42 and out of engagement with the first end 38 of the ring 14.

A support 50 extends from a second end 52 of the sleeve 34 and away from the surface 26. Generally a disc 54 will close the second end 52 of the sleeve 34 and the aforementioned disc 54 will serve to support the support 50. The apparatus will preferably include means supported by the sleeve 34 for engaging a second end 56 of the ring 14 whereby movement of the sleeve 14 towards the surface 26 will serve to seat a ring 14 about the cylindrical member 24. Generally the disc 54 will serve to support the ring engaging means for the second end 56 of the ring 14.

A lever 58 forms a part of the apparatus 32 along with means such as a removable pin 60 for pivotally attaching a central portion 62 of the lever 58 to the support 50. It may be desirable in some embodiments of the invention to make the apparatus 34 useful with couplers 10 having flanges 28 of different extensions. In such an instance, the central portion 62 of the lever 58 may include a plurality of holes 64 therethrough whereby the pin 60 can removably secure the central portion 62 of the lever 58 to the support 50 at any selected one of the hole 64.

One end 66 of the lever 58 serves as a handle to move another end 68 generally longitudinally relative to the support 50. The other end 68 of the lever 58 include means attached thereto for engaging with the flange 28. In the particular embodiment illustrated the flange engaging means comprises a mouth 70 at the end of a linearly extending arrangement 72, which in the particular embodiment illustrated is adjustable in length through appropriate placing of a bolt 74 within each of a pair of slots 76 and 78. This provides additional adjustment when couplers 10 having differently placed flanges 28 are to be acted upon by the same apparatus 32. A lower end 80 of the mouth 70 is adapted for engagement with a bottom 82 of the flange 28 while an upper end 84 of the mouth 70 is adapted for engagement with an upper end 86 of the flange 28. While reference herein is to to upper and lower ends it should be noted that the alignment of the coupler 10 and the apparatus 32 may be varied at will. It is clear that when one pivots the lever 58 to cause the upper end of the mouth 70 to bear against the upper surface 86 of the flange 28 through pushing upwardly upon the handle 66 of the lever 58 a force is provided on the flange 28 towards the surface 26 whereupon the first end ring engaging means, in the particular embodiment illustrated the toe means 44, move the ring 14 away from the surface 26 and remove the ring 14 from the cylindrical member 24. It is also clear that on pivoting of the lever 58 by pushing downwardly on the handle 56 thereof the lower end 80 of the mouth 70 contacts the bottom 82 of the flange 28 and exerts a force on the flange 28 away from the surface 26 whereby the second end ring engaging means, in the embodiment illustrated a ridge 88 bears against the second end 56 of the ring 14 and moves the ring 14 towards the surface 26 whereby a ring 14 can be replaced about the cylindrical member 24 after the elastomeric ring 12 has been replaced. It should further be noted that the linearly extending member 72 which serves as the flange engaging means is generally pivotally attached to the end 68 of the lever 58. In the particular embodiment illustrated a pivot 90 serves this purpose. The use of the pivot 90 supplies more adjustment for use of the apparatus 32 with couplers 10 having differently sized flanges 28.

Figure 4:
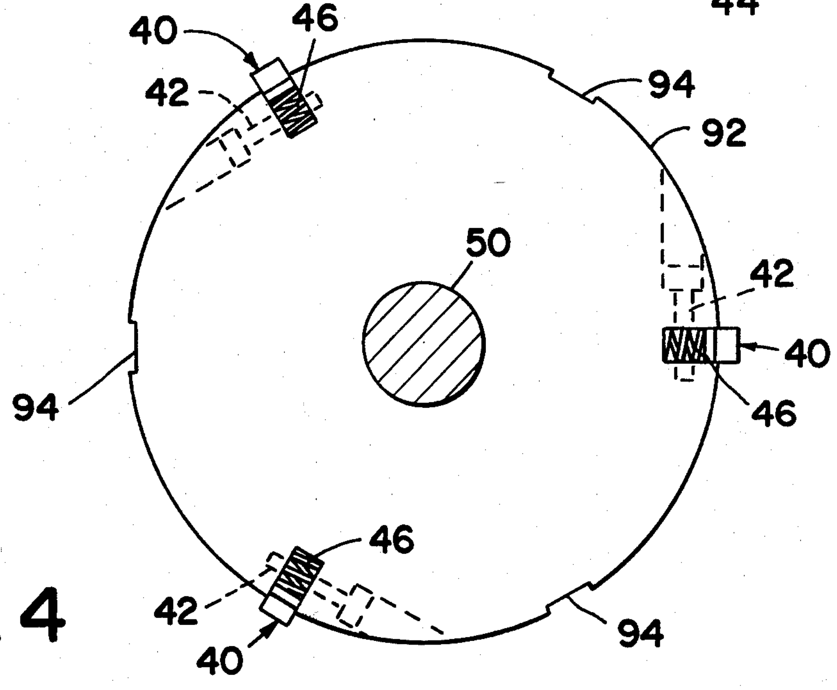
FIG. 4 illustrates a view taken along the line IV—IV of FIG. 2.
Figure 5:
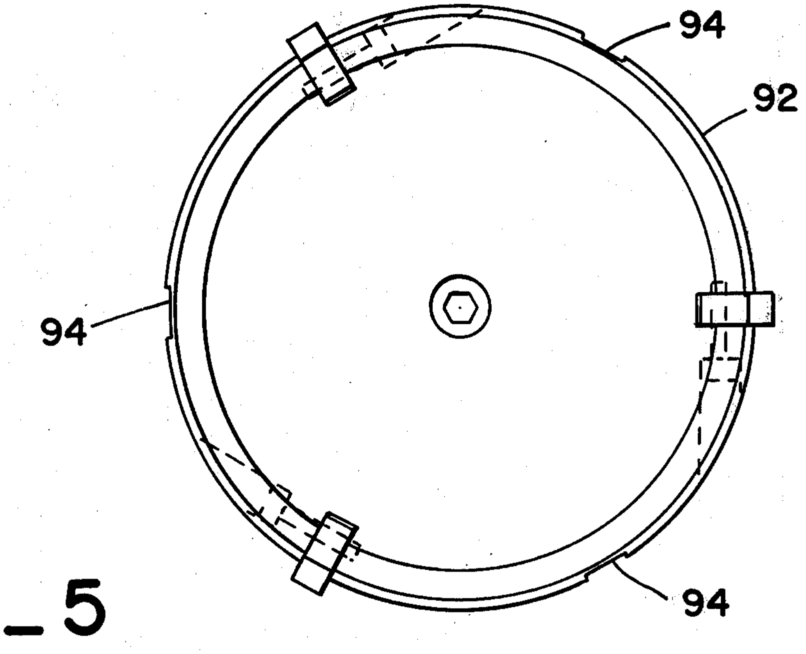
FIG. 5 illustrates a view taken along the line V—V of FIG. 2.

By particular reference to FIGS. 4 and 5 it will become apparent that the apparatus 32 and more particularly an outer surface 92 thereof preferably includes a plurality of longitudinally extending slots 94, the slots 94 being in one to one relationship and each being arranged to slidingly accept a respective one of a plurality of legs 96 which extend radially inwardly from the flange 28 and which serve to fasten the coupler 10 against a mating adaptor. It will also be apparent that the mouth 70 will generally not engage the flange 28 where it is widened at 97 to provide room for the legs 96. Further, when the slots 94 accept the legs 96 the lever 58 is so arranged as by appropriate rotation thereof or by fixed arrangement thereof that the mouth 70 does not engage the widened portion 97 of the flange 28.

It will be apparent from the foregoing description that the apparatus 32 of the present invention is particularly useful for removing and replacing rings such as the ring 14 from about a cylindrical member such as the cylindrical member 24. It is further clear that such removal and replacement takes place without undue strain being placed upon the ring 14. It is further apparent that such removal and replacement can be accomplished very quickly thus cutting down on down time.

While the invention has been described in connection with specific embodiments thereof, it will be understood that it is capable of further modification, and this application is intended to cover any variations, uses or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

That which is claimed is:

1. Apparatus for removing and replacing a ring which fits tightly about a cylindrical member, said member proceeding away from a generally flat surface, a generally circular flange proceeding from a portion of said surface located outwardly radially of said ring; said apparatus comprising:
- a sleeve sized to fit about said ring with a first end of said sleeve adjacent said surface;
- means carried by said sleeve and spaced circumferentially thereabout for engaging a first end of said ring, said first ring end being adjacent said surface;
- means for selectively positioning said first ring end engaging means in and out of engagement with said first ring end;
- a support extending from a second end of said sleeve away from said surface;
- a lever;
- means for pivotally attaching a central portion of said lever to said support; and
- means attached adjacent an end of said lever for engaging with said flange whereby on pivoting of said lever to cause said flange engaging means to exert a force on said flange towards said surface, said first end ring engaging means move said ring away from said surface and remove said ring from said cylindrical member.

2. Apparatus as in claim 1, including:
- means supported by said sleeve for engaging a second end of said ring whereby on pivoting of said lever to cause said flange engaging means to exert a force on said flange away from said surface said second end ring engaging means move said ring towards said surface and replace said ring about said cylindrical member.

3. Apparatus as in claim 1, wherein said means for engaging said first end of said ring comprises:
- a plurality of arms spaced circumferentially about said sleeve;
- means for mounting said arms to said sleeve; and
- toe means on each of said arms for engagingly contacting said first end of said ring.

4. Apparatus as in claim 3, including:
- means supported by said sleeve for engaging a second end of said ring whereby on pivoting of said lever to cause said flange engaging means to exert a force on said flange away from said surface said second end ring means move said ring towards said surface and replace said ring about said cylindrical member.

5. Apparatus as in claim 3, wherein said arm mounting means comprise pivotal mountings and said selective positioning means comprise means for biasing said first ring end engaging means into engagement with said first ring end and extending portions of said arms against which a force is operator exertable to overcome said biasing means.

6. Apparatus as in claim 5, including:
- means supported by said sleeve for engaging a second end of said ring whereby on pivoting of said lever to cause said flange engaging means to exert a force on said flange away from said said surface said second end ring engaging means move said ring towards said surface and replace said ring about said cylindrical member.

7. Apparatus as in claim 5, wherein said lever includes a plurality of holes therethrough in said central portion thereof and said pivotal lever attaching means comprises a pin removably secured to said support and any selected one of said holes.

8. Apparatus as in claim 7, including:
- means supported by said sleeve for engaging a second end of said ring whereby on pivoting of said lever to cause said flange engaging means to exert a force on said flange away from said surface said second end ring engaging means move said ring towards said surface and replace said ring about said cylindrical member.

9. Apparatus as in claim 7, including:
- means for pivotally attaching said flange engaging means adjacent said one end of said lever.

10. Apparatus as in claim 9, including:
- means supported by said sleeve for engaging a second end of said ring whereby on pivoting of said lever to cause said flange engaging means to exert a force on said flange away from said surface said second end ring engaging means move said ring towards said surface and replace said ring about said cylindrical member.

11. Apparatus as in claim 10, including:
- means for adjusting the longitudinal extension of said flange engaging means.

12. Apparatus as in claim 10, including:
- a plurality of longitudinally extending slots in an outer surface of said sleeve, said slots being in one-to-one relation with and each being arranged to slidingly accept a respective one of a plurality of legs which extend radially inwardly from said flange.

13. Apparatus as in claim 9, including:
- a disc closing said second end of said sleeve, said disc supporting said support and said ring second end engaging means.

* * * * *